United States Patent
Errera et al.

(10) Patent No.: US 8,680,728 B2
(45) Date of Patent: Mar. 25, 2014

(54) THERMAL SHIELD FOR SYSTEM FOR GENERATING ELECTRIC POWER

(75) Inventors: Michael R. Errera, Milner, GA (US); Kenton D. Gills, Jonesboro, GA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/566,358

(22) Filed: Aug. 3, 2012

(65) Prior Publication Data

US 2013/0026765 A1      Jan. 31, 2013

Related U.S. Application Data

(63) Continuation of application No. 12/217,809, filed on Jul. 9, 2008, now abandoned.

(60) Provisional application No. 61/129,417, filed on Jun. 25, 2008.

(51) Int. Cl.
*H02K 5/10* (2006.01)
*F02B 43/08* (2006.01)

(52) U.S. Cl.
USPC ........ 310/86; 123/3; 123/2; 290/1 A; 290/1 R

(58) Field of Classification Search
USPC .......... 123/2, 3, 369, 370; 310/64, 85, 86, 89; 290/1 A, 1 R
See application file for complete search history.

(56) References Cited

U.S. PATENT DOCUMENTS

| | | |
|---|---|---|
| 2,077,543 A | 4/1937 | Barthel |
| 4,136,432 A | 1/1979 | Melley, Jr. |
| 4,226,214 A | 10/1980 | Palazzetti |
| 4,503,337 A | 3/1985 | Hafner et al. |
| 4,548,164 A | 10/1985 | Ylonen et al. |
| 4,835,405 A | 5/1989 | Clancey et al. |
| 5,778,832 A | 7/1998 | King et al. |
| 5,784,267 A | 7/1998 | Koenig et al. |
| 5,815,058 A | 9/1998 | Gizaw |
| 5,850,061 A | 12/1998 | Klompenhouwer et al. |
| 5,856,740 A | 1/1999 | Rau et al. |
| 5,896,049 A | 4/1999 | Saunders et al. |
| 5,899,174 A | 5/1999 | Anderson et al. |
| 5,929,610 A | 7/1999 | Friedlander et al. |
| 6,005,381 A | 12/1999 | Saunders et al. |
| 6,230,667 B1 | 5/2001 | Stauffer et al. |
| 6,281,602 B1 | 8/2001 | Got et al. |
| 6,351,692 B1 | 2/2002 | Eaton et al. |
| 6,355,986 B1 | 3/2002 | Kato et al. |
| 6,376,944 B1 | 4/2002 | Grizzle, Jr. et al. |
| 6,397,821 B1 | 6/2002 | Spagele et al. |
| 6,433,444 B1 | 8/2002 | de Vries |
| 6,450,133 B1 | 9/2002 | Bernard et al. |
| 6,492,740 B2 | 12/2002 | Suzuki |
| 6,507,128 B2 | 1/2003 | King et al. |
| 6,520,124 B2 | 2/2003 | Bohm, II |

(Continued)

*Primary Examiner* — Ehud Gartenberg
*Assistant Examiner* — Arun Goyal
(74) *Attorney, Agent, or Firm* — Finnegan, Henderson, Farabow, Garrett & Dunner LLP

(57) ABSTRACT

A thermal shield for a system for generating electric power may include a sheet of material configured to be operably associated with an engine of the system for generating electric power such that heat from the engine is deflected back toward the engine. The sheet of material may define a generally rectangular shape defining a length dimension and a width dimension, and the length dimension may be configured to generally correspond to a length defined by the engine.

17 Claims, 3 Drawing Sheets

(56) References Cited

U.S. PATENT DOCUMENTS

| | | |
|---|---|---|
| 6,534,737 B1 | 3/2003 | Rademacher et al. |
| 6,552,454 B2 | 4/2003 | Kern et al. |
| 6,555,929 B1 | 4/2003 | Eaton et al. |
| 6,601,542 B2 | 8/2003 | Campion |
| 6,630,756 B2 | 10/2003 | Kern et al. |
| 6,631,310 B1 | 10/2003 | Leslie |
| 6,633,799 B2 | 10/2003 | Krakovich et al. |
| 6,639,331 B2 | 10/2003 | Schultz |
| 6,644,247 B2 | 11/2003 | Campion |
| 6,668,629 B1 | 12/2003 | Leslie |
| 6,697,951 B1 | 2/2004 | Sinha et al. |
| 6,700,356 B1 | 3/2004 | Dorn |
| 6,701,221 B1 | 3/2004 | Eaton et al. |
| 6,731,098 B1 | 5/2004 | Hintz et al. |
| 6,737,762 B2 | 5/2004 | Koenig |
| 6,765,157 B2 | 7/2004 | Rademacher et al. |
| 6,765,304 B2 | 7/2004 | Baten et al. |
| 6,784,560 B2 * | 8/2004 | Sugimoto et al. ............. 290/1 R |
| 6,784,562 B2 | 8/2004 | Gennesseaux |
| 6,784,574 B2 | 8/2004 | Turner et al. |
| 6,786,195 B2 | 9/2004 | Doelker |
| 6,798,627 B2 | 9/2004 | Schultz et al. |
| 6,824,067 B2 | 11/2004 | Kern et al. |
| 6,869,367 B2 | 3/2005 | Herdin et al. |
| 6,876,103 B2 | 4/2005 | Radusewicz et al. |
| 6,877,481 B2 | 4/2005 | Fahringer et al. |
| 6,895,903 B2 | 5/2005 | Campion |
| 6,919,518 B2 | 7/2005 | Rademacher et al. |
| 6,965,818 B2 | 11/2005 | Koenig et al. |
| 6,980,911 B2 | 12/2005 | Eaton et al. |
| 6,994,074 B2 | 2/2006 | Doelker |
| 7,005,760 B2 | 2/2006 | Eaton et al. |
| 7,007,966 B2 | 3/2006 | Campion |
| 7,016,793 B2 | 3/2006 | Ye et al. |
| 7,021,293 B2 | 4/2006 | Dolker |
| 7,072,759 B2 | 7/2006 | Dolker |
| 7,081,682 B2 | 7/2006 | Campion |
| 7,082,896 B2 | 8/2006 | Allen et al. |
| 7,121,257 B2 | 10/2006 | Dolker |
| 7,129,593 B2 | 10/2006 | King et al. |
| 7,157,811 B2 | 1/2007 | Eaton et al. |
| 7,193,333 B1 | 3/2007 | Kitch |
| 7,202,638 B2 | 4/2007 | Ye et al. |
| 7,207,305 B2 | 4/2007 | Dolker |
| 7,259,481 B2 | 8/2007 | Eaton et al. |
| 7,262,516 B2 | 8/2007 | Kleen |
| 7,271,571 B2 | 9/2007 | Ye et al. |
| 7,315,769 B2 | 1/2008 | Balan et al. |
| 7,319,307 B2 | 1/2008 | Wiegman et al. |
| 7,332,825 B2 | 2/2008 | Annen et al. |
| 7,352,072 B2 | 4/2008 | Dolker et al. |
| 7,362,696 B2 | 4/2008 | Ferry et al. |
| 7,392,770 B2 | 7/2008 | Xiao |
| 7,401,978 B2 | 7/2008 | Nakano et al. |
| 7,642,665 B2 | 1/2010 | Konop et al. |
| 7,795,745 B2 | 9/2010 | Mellon et al. |
| 2002/0047689 A1 | 4/2002 | Bessho et al. |
| 2002/0121818 A1 | 9/2002 | Turner et al. |
| 2002/0158530 A1 | 10/2002 | Gennesseaux |
| 2003/0011196 A1 | 1/2003 | Kern et al. |
| 2003/0011258 A1 | 1/2003 | Kern et al. |
| 2003/0020482 A1 | 1/2003 | Hobelsberger et al. |
| 2003/0155330 A1 | 8/2003 | Rademacher et al. |
| 2004/0016627 A1 | 1/2004 | Rademacher et al. |
| 2004/0079329 A1 | 4/2004 | Doelker |
| 2004/0104577 A1 | 6/2004 | Alger et al. |
| 2004/0168654 A1 * | 9/2004 | Radtke ............................. 123/2 |
| 2005/0224047 A1 | 10/2005 | Doelker |
| 2005/0253394 A1 | 11/2005 | Dolker et al. |
| 2006/0052922 A1 | 3/2006 | Koenig et al. |
| 2006/0080013 A1 | 4/2006 | Koenig et al. |
| 2006/0082228 A1 | 4/2006 | Urbahn et al. |
| 2007/0013191 A1 | 1/2007 | Kleen |
| 2007/0089411 A1 | 4/2007 | Leistner et al. |
| 2007/0145745 A1 | 6/2007 | Woods et al. |
| 2008/0073979 A1 | 3/2008 | Wiegman et al. |
| 2008/0074910 A1 | 3/2008 | Casteel et al. |

* cited by examiner

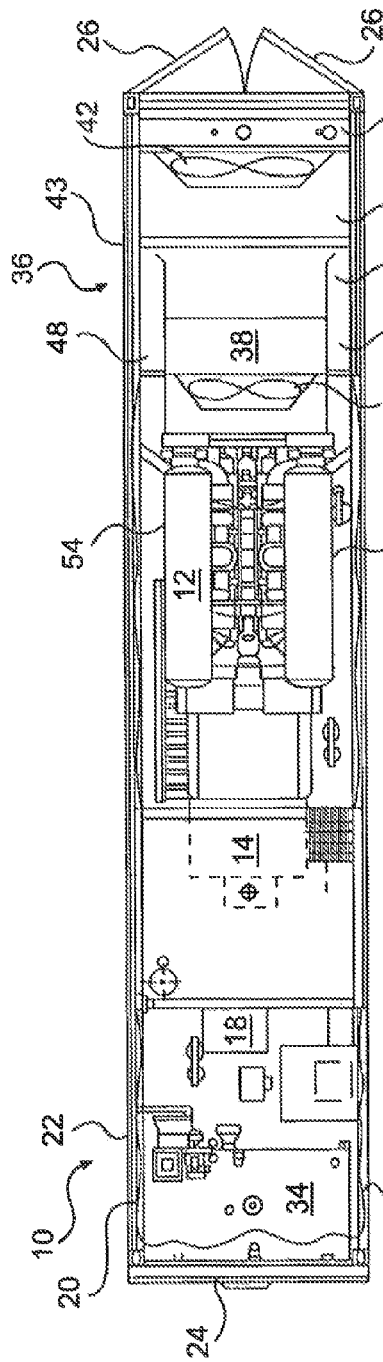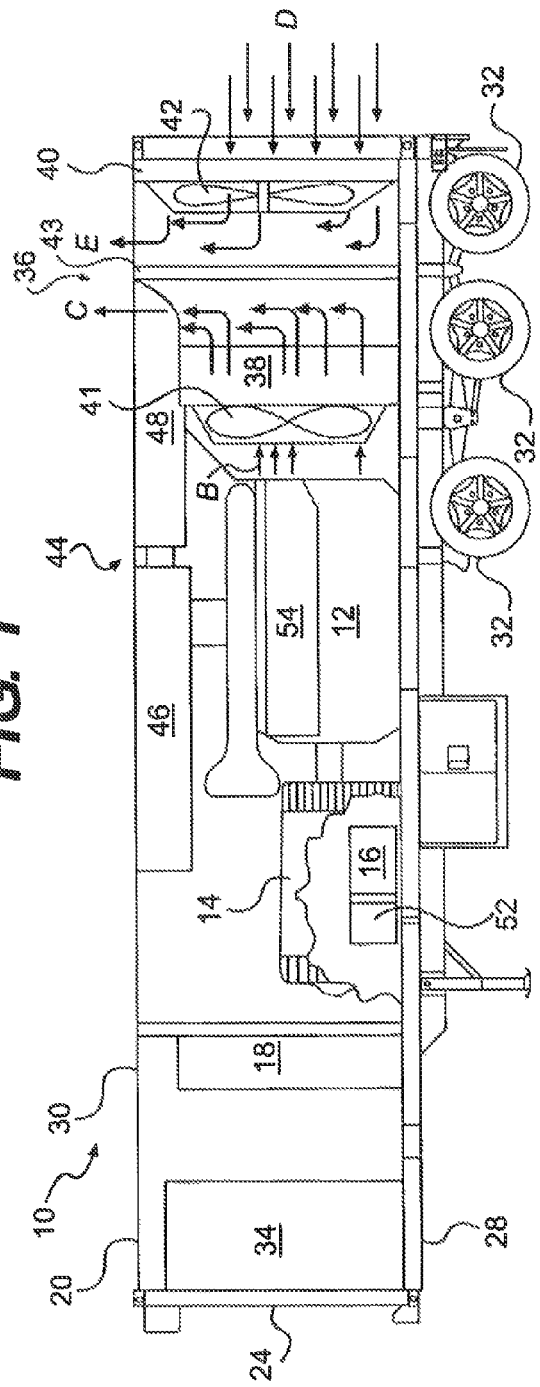

THERMAL SHIELD FOR SYSTEM FOR GENERATING ELECTRIC POWER

This is a continuation of application Ser. No. 12/217,809, filed Jul. 9, 2008, now abandoned which claims the benefit of U.S. Provisional Application No. 61/129,417, filed Jun. 25, 2008, the disclosures of both of which are incorporated herein by reference.

TECHNICAL FIELD

The present disclosure relates to a thermal shield, and more particularly, to a thermal shield for a system for generating electric power.

BACKGROUND

It may be desirable to generate electric power, for example, in situations in which electric power is not available from an electric power utility source, for example, in remote locations and/or locations experiencing a power outage. This may be accomplished, for example, using electric power generation systems that are configured to generate electric power via operation of one or more internal combustion engines to drive an electric machine configured to convert mechanical power supplied by the one or more engines into electric power.

Such power generation systems may be configured to facilitate transport of the power generation system to a location where such power generation is desired. Some such systems may be housed in, for example, a container such as a trailer, and operation of the engine(s) and/or electric machine may result in accumulation of heat inside the container. Thus, it may be desirable to prevent an accumulation of heat within the container in order to improve operation of the power generation system.

A portable power module is disclosed in U.S. Pat. No. 7,007,966, issued to Campion ("the '966 patent"). The '966 patent discloses air ducts for a portable power module trailerable over public roads. The portable power module includes a shipping container housing a gaseous fuel motor drivably connected to an electrical generator. The '966 patent discloses air ducts positioned on a side of the container, which introduce ambient air into the container for cooling of the motor and the generator and for combustion in the motor. The '966 patent does not disclose, however, a thermal shield for the power modules disclosed in the '966 patent.

The systems and methods described in an exemplary manner in the present disclosure may be directed to mitigating or overcoming one or more of the drawbacks set forth above.

SUMMARY

In one aspect, the present disclosure includes a thermal shield for a system for generating electric power. The thermal shield may include a sheet of material configured to be operably associated with an engine of the system for generating electric power such that heat from the engine is deflected back toward the engine. The sheet of material may define a generally rectangular shape defining a length dimension and a width dimension, and the length dimension may be configured to generally correspond to a length defined by the engine.

According to a further aspect, a system for generating electric power may include an engine configured to output mechanical power and an electric machine configured to convert mechanical power into electric power. The electric machine may be operably coupled to the engine. The system may further include a housing defining an area containing the engine and at least one air passage configured to provide flow communication between an exterior of the housing an the area. The system may also include at least one panel operably associated with the engine and configured to deflect heat associated with operation of the engine.

According to another aspect, a method for increasing the effectiveness of a heat exchanger associated with a system for generating electric power may include operably associating at least one panel with an engine of the system, such that the at least one panel is provided between the engine and a wall of a housing containing the engine and the heat exchanger. The method may further include flowing air to the heat exchanger between the at least one panel and the wall.

BRIEF DESCRIPTION OF THE DRAWING

FIG. 1 is a schematic, partial cutaway plan view of an exemplary embodiment of a system for generating electric power.

FIG. 2 is a schematic, partial cutaway elevation view of the exemplary embodiment shown in FIG. 1.

DETAILED DESCRIPTION

Figure 3:
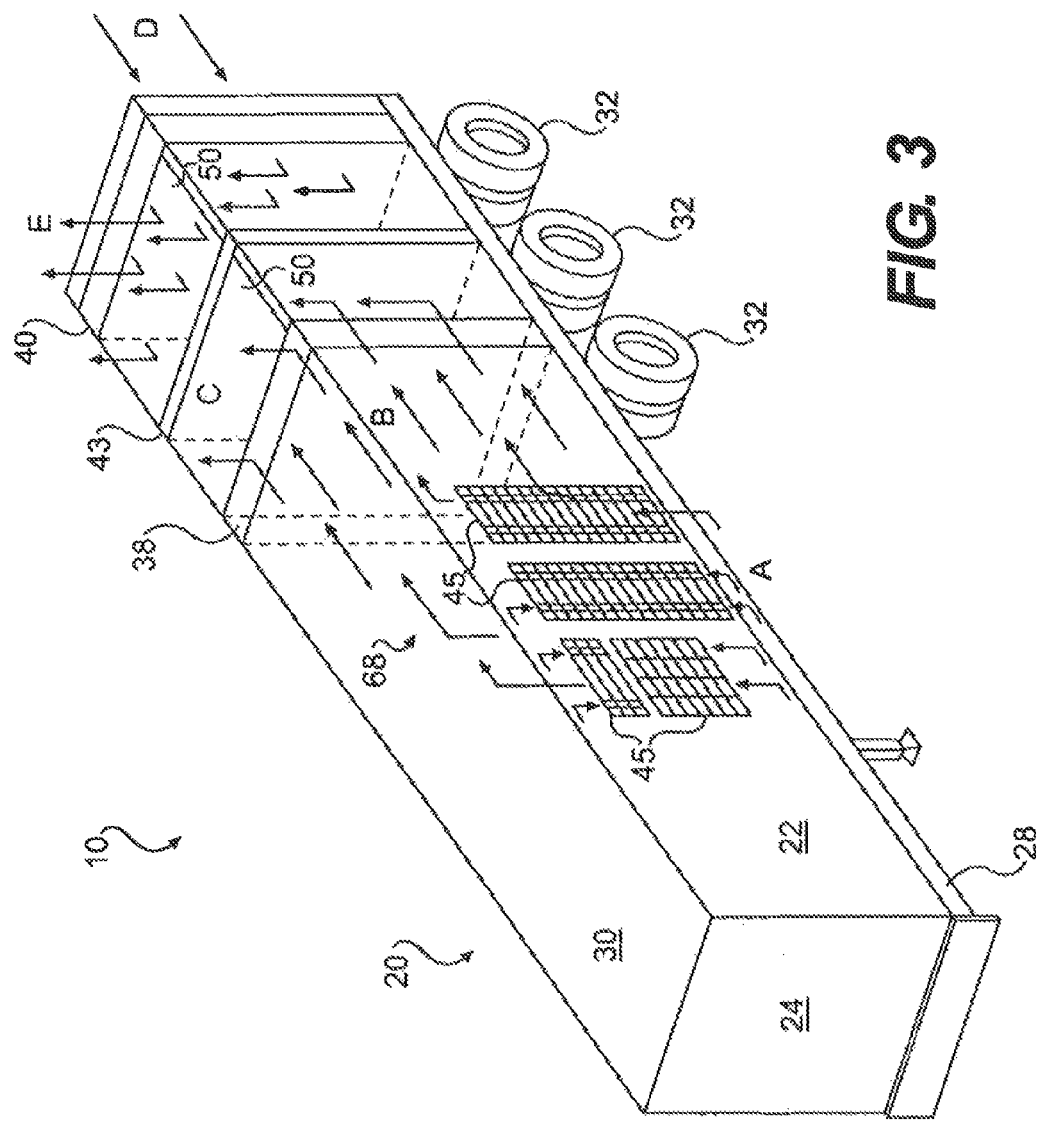
FIG. 3 is a schematic, partial cutaway perspective view of an exemplary embodiment of a system for generating electric power.

FIGS. 1 and 2 show an exemplary embodiment of a system 10 for generating electric power. System 10 may include an engine 12 configured to supply mechanical power and an electric machine 14 operably coupled to engine 12 and configured to convert mechanical power into electric power. Engine 12 may be any internal combustion engine, including a spark-ignition engine, a compression ignition engine, a homogeneous-charge compression-ignition engine, and/or a gas turbine engine. Engine 12 may be configured to run on any fuel, such as, for example, gasoline, diesel fuel including bio-diesel fuel, natural gas, ethanol, methanol, hydrogen, and/or any combinations thereof. Other types of engines and fuels are contemplated. Electric machine 14 may be any type of electric generator known to those skilled in the art. For example, electric machine 14 may include a three-phase AC synchronous generator.

System 10 may further include power load connections 16 configured to facilitate supply of electric power generated by system 10 to any device or system that receives input of a source of electric power, such as, for example, a power grid. According to some embodiments, a number of systems 10 may be coupled to one another and/or used together to supply additional electric power.

As depicted in FIGS. 1 and 2, exemplary system 10 may include one or more control panels 18 configured to control operation of engine 12, electric machine 14, and/or any systems associated with system 10. For example, control panel(s) 18 may include electronic control systems configured to control operation of engine 12 and/or electric machine 14, such that system 10 supplies electric power in a desired and/or controlled manner. According to some embodiments, control panel 18 may include an interface for providing an operator with information or data relating to operation of engine 12 and/or electric machine 14, and further, may include controls configured to facilitate an operator's ability to control operation of engine 12, electric machine 14, and/or any other systems associated with system 10. For example, control panel 18 may facilitate an operator's control of the electric power output of system 10, for example, by controlling the voltage and frequency of the power output.

According to the exemplary embodiment shown in FIGS. 1 and 2, system 10 may include a housing 20 configured to provide protection and/or transportability to various components of system 10. For example, housing 20 may include walls, for example, opposing side walls 22, a front wall 24, and one or more rear doors 26, a floor 28, and a roof 30, defining an exterior and, possibly also, an interior of housing 20. According to some embodiments, system 10 may include one or more devices 32 configured to facilitate transport of system 10 between sites that may desire a supply of electric power. For example, the exemplary embodiment shown in FIG. 1 includes a number of wheels for facilitating towing of system 10 via a vehicle, such as a truck or tractor (e.g., housing 20 may be in the form at least similar to a trailer configured to be towed in a manner similar to trailers of a tractor trailer rig). Other types of devices 32 (e.g., tracks, wheels configured to travel along railroad tracks, pontoons, and/or skids) known to those skilled in the art are contemplated. As explained in more detail herein, some embodiments of housing 20 may define one or more passages between an exterior of housing 20 and an interior of housing 20.

According to some embodiments, system 10 may include a reservoir 34 (e.g., a fuel tank) within the interior of housing 20 for providing a supply of fuel to engine 12. Reservoir 34 may be coupled to engine 12 via one or more fuels lines (not shown). According to some embodiments, reservoir 34 may be located external to housing 20 and/or fuel may be supplied via an external source, such as, for example, a pipe line for supplying a fuel, such as, for example, gasoline, diesel fuel, natural gas, hydrogen, ethanol, methanol, and/or any combinations thereof.

According to some embodiments, system 10 may include a cooling system 36 configured to regulate the temperature of engine 12 and/or electric machine 14. For example, cooling system 36 may include one or more heat exchangers 38, such as, for example, one or more air-to-air-after-coolers (ATAAC) operably coupled to engine 12 and/or one or more radiators 40, such as, for example, a jacket water radiator, operably coupled to engine 12. According to some embodiments, engine 12 may include one or more turbochargers (not shown), and heat exchanger(s) 38 may be operably coupled to the one or more turbochargers to cool air entering the turbocharger(s). System 10 may include one or more fans 41, for example, located between engine 12 and heat exchanger(s) 38. Fan(s) 41 may be operably coupled to engine 12 via a drive belt (not shown) and/or may be driven via an electric motor (not shown), and may supply a flow of air to and/or through heat exchanger 38 in order to provide cooling air to heat exchanger 38.

Exemplary radiator(s) 40 may be configured to receive and cool a flow of coolant (e.g., a liquid coolant), which may be circulated into and/or through engine 12 via coolant lines (not shown), thereby cooling engine 12. One or more fans 42 may be associated with radiator 40 and may be configured to provide a flow of cooling air to radiator 40. Fan(s) 42 may be driven, for example, via an electric motor (not shown), which may be coupled to fan 42 via, for example, a belt drive (not shown).

According to some embodiments, as shown in FIGS. 1 and 2, housing 20 may include a partition 43 positioned between heat exchanger 38 and radiator 40. One or more of side walls 22 of housing 20 may include air passages 45 (e.g., louvers (see FIG. 3)) configured to permit passage of air into and/or out of housing 20. Further, roof 30 of housing 20 may define one or more openings 50 located in the vicinity of (e.g., adjacent to) heat exchanger 38 and/or radiator 40. According to some embodiments, fan(s) 41 associated with heat exchanger 38 may be configured to draw air into housing 20 at A via passages 45 and through heat exchanger 38 at B (see FIGS. 2 and 3). Upon flow though heat exchanger 38, the air may be diverted via partition 43 and through opening(s) 50 in roof 30 at C.

According to some embodiments, fan(s) 30 may be configured to draw air into and through radiator 40 via an open end of housing 20, for example, via opening one or more of rear doors 26 (or via openings (not shown) in rear doors 26) at D, where the air may then be diverted via partition 43 and out opening(s) 50 in roof 38 at E.

According to some embodiments, engine 12 may include an exhaust system 44 (see FIGS. 1 and 2) configured to remove heat and/or combustion products from housing 20. For example, exhaust system 44 may include a roof-mounted muffler 46 in flow communication with engine 12. Exhaust system 44 may further include one or more extensions 48 downstream of muffler 46 configured to provide a flow path for exhaust gas from engine 12 to the exterior of housing 20 via muffler 46. For example, as shown in FIG. 1, extension(s) 48 may extend above heat exchanger 38 from muffler 46 to one or more opening(s) 50 in roof 30, such that exhaust gas exits via opening(s) 50.

According to some embodiments, for example, as shown in FIG. 2, system 10 may include an interface 52 for facilitating control and/or monitoring of system 10. For example, interface 52 may include electrical connectors for facilitating electric connection between controller(s) 18 and systems located exterior to housing 20 for facilitating, for example, load sharing between power generation systems, provision of shore power (e.g., power for battery chargers and/or control system associated with system 10), and/or monitoring of the status of system 10.

Figure 4:
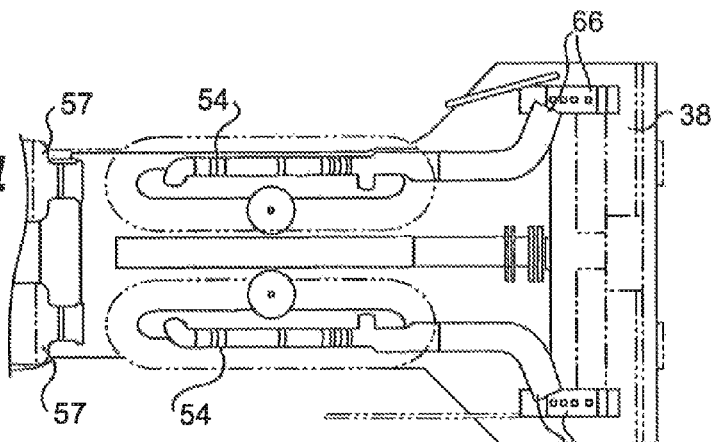
FIG. 4 is a schematic, plan view of an exemplary embodiment of a thermal shield and an engine.
Figure 5:
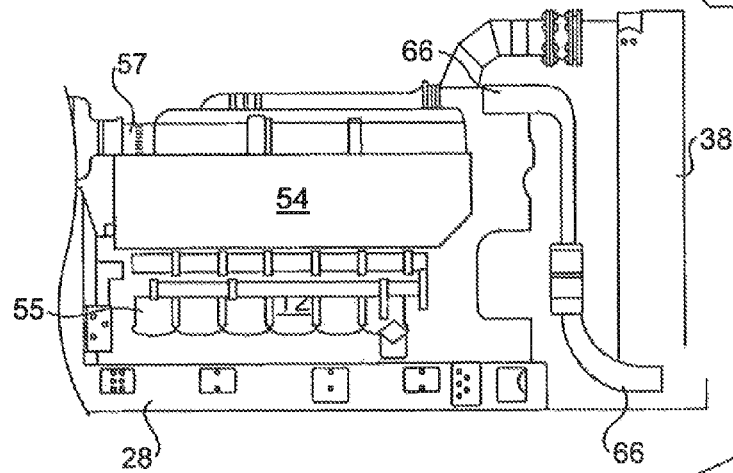
FIG. 5 is a schematic, elevation view of the exemplary embodiment shown in FIG. 4.

As shown in FIGS. 4 and 5, according to some embodiments, system 10 may include one or more panels 54 configured to shield thermal energy (e.g., heat) that may associated with operation of engine 12. For example, panel(s) 54 may be operably coupled to opposite sides of engine 12, and may serve to deflect and/or reflect heat from engine 12. For example, panels 54 may be operably coupled via brackets and/or directly to engine 12. For example, panels 54 may be operably coupled to an engine block 55 of engine 12, to intake passages 57 (e.g., intake plenum or manifold), and/or exhaust passages (e.g., exhaust manifold) (not shown).

Figure 6:
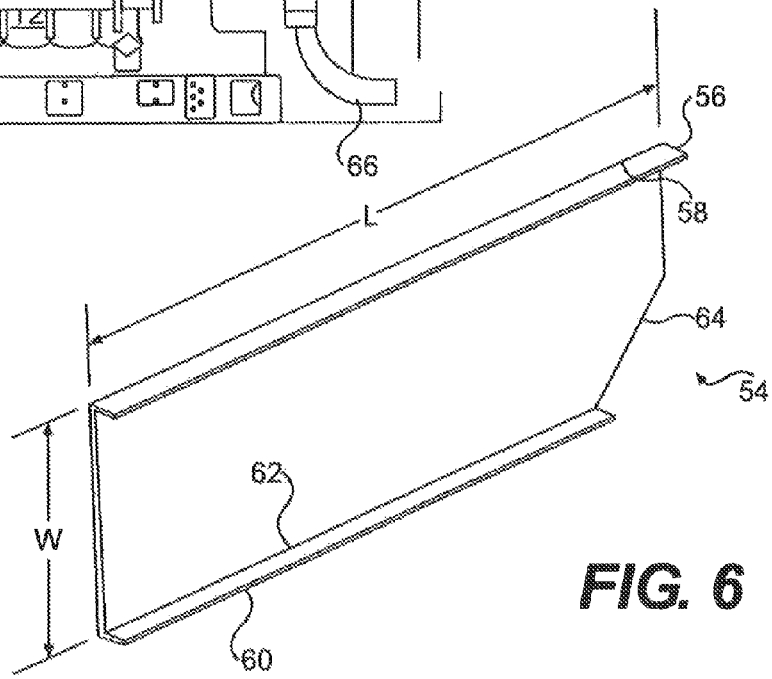
FIG. 6 is a schematic, perspective view of an exemplary embodiment of a thermal shield.

As shown in FIG. 6, panels 54 may define a length dimension L and width dimension W. Length L and width W may depend, for example, on a length dimension and/or a height dimension associated with engine 12. For example, length L of panels 54 may generally correspond to the length of engine block 55 or cylinder heads (not shown) of engine 12. Width W may generally correspond to the height dimension of engine 12 between, for example, a lower edge of the cylinder heads up to intake passages 57. Alternatively, length L and/or width W may be longer or shorter, for example, width W may be selected such that panels 54 extend from a lower edge of engine block 55 to an upper edge of the cylinder heads, or event to the lower edge of intake passages 57. According to some embodiments, panels 54 (i.e., panels 54 include two panels located on opposite sides of engine 12, as shown in FIG. 4) may have differing dimensions and/or configurations.

According to some embodiments, panels 54 may be formed of sheet steel, or any other suitable material. For example, panels 54 may be formed of a sheet of material having a thickness ranging from about 10 gage to about 20 gage, for example, from about 14 gage to about 16 gage. According to some embodiments, panels 54 may include configurations and/or portions that serve to increase the stiffness of panels 54, for example, to reduce vibration and/or noise. For example, as shown in FIG. 6, exemplary panels 54 include a flange 56 extending along an upper edge 58 of panel 54. Panel 54 may further include a flange 60 extending along a lower edge 62 of panel 54. Flanges 56 and/or 60 may be formed integrally with panel 54 or may be formed separately and may be operably coupled to panel 54, via welding and/or fasteners, such as screws, bolts, and/or rivets. Flanges 56 and 60 may extend from panel 54 in either direction, for example, in the same direction or in opposite directions. Panels 54 may also define configurations 64 (i.e., relative to panel 54 defining a substantially rectangular shape), for example, edge configurations and/or portions cut-out from the interior of panel 54. For example, as shown in FIG. 3, panel 54 defines an edge configuration at 64 in the shape of a triangle removed from a corner of panel 54. Configurations 64 may define any rectilinear and/or curvilinear shape and may serve to provide clearance for parts of system 10, for example, parts associated with engine 12.

According to some embodiments (see FIGS. 4 and 5), thermal insulation 66 may be provided around plumbing associated with heat exchanger 38 and/or radiator 40. For example, thermal insulation 66 may include any insulation blanket material, such as, for example, a blanket having a woven and/or non-woven cloth and a cover (e.g., a nylon blanket having a silicon cover). Exemplary insulation 66 may serve to prevent exchange of heat between, for example, plumbing associated with heat exchanger 38 and/or radiators 40, and the interior of housing 20. This may result in reducing the temperature of the air in portions of housing 20 through which cooling air flows, for example, from exemplary air passages 45 to heat exchanger 38.

As shown in FIG. 3, for example, fan(s) 41 associated with heat exchanger 38 may be configured to draw air into housing 20 at A via passages 45 and into area 68 in the interior of housing 20. Area 68 may serve to enclose, for example, engine 12 and/or electric machine 14. Fan(s) 41 may draw air from area 68 through heat exchanger 38 at B. Upon flow though heat exchanger 38, the air may be diverted via partition 43 and through opening(s) 50 in roof 30 at C.

INDUSTRIAL APPLICABILITY

Exemplary system 10 may be used to generate electric power, for example, in situations in which electric power is not available from an electric power utility source, for example, in remote locations and/or locations experiencing a power outage. One or more engines 12 of exemplary system 10 may be configured to output mechanical power, and one or more electric machines 14 may be configured to convert mechanical power into electric power. One or more control panels 18 may be configured to facilitate control of at least one of engine 12 and electric machine 14. Housing 20 may be configured to contain at least one of engine 12 and electric machine 14.

System 10 may be provided with one or more panels 54, which may be configured to shield thermal energy (e.g., heat) that may associated with operation of engine 12. For example, panels 54 may be operably coupled to opposite sides of engine 12 and may serve to deflect and/or reflect heat (e.g., radiant heat) from engine 12. According to some embodiments, panels 54 may serve to shield heat from engine 12 during operation and reduce the effects of such heat in increasing the temperature of the air as it flows through area 68 before flowing through heat exchanger(s) 38. This may serve to increase the effectiveness of heat exchanger 38 in cooling air entering one or more intake passages (or turbochargers) associated with engine 12. This, in turn, may increase the efficiency of engine 12 and/or reduce emissions associated with operation of engine 12. According to some embodiments, thermal insulation 66 may serve an at least similar function.

It will be apparent to those skilled in the art that various modifications and variations can be made to the exemplary disclosed systems for generating electric power. Other embodiments will be apparent to those skilled in the art from consideration of the specification and practice of the exemplary disclosed systems and methods. It is intended that the specification and examples be considered as exemplary only.

What is claimed is:

1. A system for generating electric power, comprising:
an engine including an engine block and cylinder heads;
an electric generator operably coupled to the engine;
at least one panel coupled directly to the engine and configured to deflect heat associated with operation of the engine, the panel being located on a side of the engine, wherein the panel defines a generally rectangular shape defining a length and a width, the length of the at least one panel being substantially the same as the length of the engine block, and the width of the at least one panel covers from a lower edge of the cylinder heads up to intake passages of the engine.

2. The system of claim 1, wherein the at least one panel includes two panels operably associated with the engine, wherein each of the two panels is connected to opposite sides of the engine.

3. The system of claim 1, wherein the at least one panel defines a triangular cut-out the rectangular shape.

4. The system of claim 3, wherein the cut-out is located near a lower edge of the cylinder heads.

5. The system of claim 1, wherein the at least one panel is coupled to an intake passage of the engine via at least one bracket.

6. The system of claim 1, further including a housing, surrounding the engine and the generator.

7. The system of claim 6, wherein the housing includes one or more apertures and a fan configured to flow air through the housing.

8. The system of claim 7, wherein the at least one panel is configured to deflect heat such that it reduces the effects of the heat on a temperature of air that flows through the housing.

9. A system for generating electric power, comprising:
an engine including an engine block and cylinder heads;
an electric generator operably coupled to the engine;
a housing surrounding the engine and the generator;
at least one panel coupled directly to the engine and configured to deflect heat associated with operation of the engine, the panel being located on a side of the engine, wherein the panel defines at generally rectangular shape defining a length and a width, the length of the at least one panel being substantially the same as the length of the engine block, and the width of the at least one panel covers from a lower edge of the cylinder heads up to intake passages of the engine.

10. The system of claim 9, wherein the at least one panel includes two panels operably associated with the engine, wherein each of the two panels is connected to opposite sides of the engine.

11. The system of claim 9, wherein the at least one panel is coupled to an intake passage of the engine via at least one bracket.

12. The system of claim 9, further including a flange located on at least the top or the bottom of the at least one panel.

13. The system of claim 9, wherein the housing is a mobile housing.

14. The system of claim 9, wherein the housing includes one or more apertures and a fan configured to flow air through the housing.

15. The system of claim 9, wherein the at least one panel is configured to deflect heat such that it reduces the effects of the heat on a temperature of air that flows through the housing.

16. A system for generating electric power, comprising:
an engine including an engine block and cylinder heads;
an electric generator operably coupled to the engine;
a housing surrounding the engine and the generator;
at least one panel coupled directly to the engine and configured to deflect heat associated with operation of the engine, the panel being located on a side of the engine, wherein the panel defines a generally rectangular shape defining a length and a width, the length of the at least one panel being substantially the same as the length of the engine block, and the width of the at least one panel covers from a lower edge of the cylinder heads up to intake passages of the engine, wherein the at least one panel is configured to deflect heat such that it reduces the effects of the heat on a temperature of air that flows through the housing.

17. The system of claim 16, wherein the housing is a mobile housing having one or more apertures and a fan to flow air through the housing.

* * * * *